(12) United States Patent
Song et al.

(10) Patent No.: US 11,456,506 B2
(45) Date of Patent: Sep. 27, 2022

(54) VEHICLE BODY MEMBER HAVING CHARGING AND DISCHARGING FUNCTION

(71) Applicants: Hyundai Motor Company, Seoul (KR); Kia Motors Corporation, Seoul (KR)

(72) Inventors: Won Ki Song, Seongnam-si (KR); Hee Dae Oh, Suwon-si (KR); Min Soo Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 254 days.

(21) Appl. No.: 17/014,091

(22) Filed: Sep. 8, 2020

(65) Prior Publication Data

US 2021/0273209 A1    Sep. 2, 2021

(30) Foreign Application Priority Data

Feb. 27, 2020  (KR) .................. 10-2020-0024671

(51) Int. Cl.
*H01M 50/20* (2021.01)
*H01M 50/24* (2021.01)
(Continued)

(52) U.S. Cl.
CPC ............ *H01M 50/20* (2021.01); *B60L 50/64* (2019.02); *B60R 16/033* (2013.01); *B62D 25/06* (2013.01); *H01M 4/131* (2013.01); *H01M 4/133* (2013.01); *H01M 4/587* (2013.01); *H01M 10/0525* (2013.01); *H01M 10/0562* (2013.01); *H01M 10/0565* (2013.01); *H01M 10/0585* (2013.01);
(Continued)

(58) Field of Classification Search
None
See application file for complete search history.

(56) References Cited

U.S. PATENT DOCUMENTS 10,559,792 B1 * 2/2020 Combs ................ H01M 10/613
2015/0093629 A1 * 4/2015 Sayre ................ H01M 10/0525
429/185

(Continued)

FOREIGN PATENT DOCUMENTS

| CN | 206374545 U | 8/2017 |
| KR | 101125362 B1 | 3/2012 |
| WO | 2008023255 A2 | 2/2008 |

*Primary Examiner* — Gregg Cantelmo
(74) *Attorney, Agent, or Firm* — Slater Matsil, LLP

(57) ABSTRACT

A vehicle body member includes a first cell unit including a first negative electrode part and a first positive electrode part, a second cell unit including a second negative electrode part and a second positive electrode part, a reinforcing insulating layer interposed between a first surface of the first cell unit and a second surface of the second cell unit, a first positive electrode current collector connected to the first positive electrode part, a second positive electrode current collector connected to the second positive electrode part and connected in parallel to the first positive electrode current collector, a first negative electrode current collector connected to the first negative electrode part, and a second negative electrode current collector connected to the second negative electrode part and connected in parallel to the first negative electrode current collector.

20 Claims, 10 Drawing Sheets

(51) Int. Cl.

| | |
|---|---|
| *B60R 16/033* | (2006.01) |
| *B62D 25/06* | (2006.01) |
| *H01M 4/133* | (2010.01) |
| *H01M 10/0562* | (2010.01) |
| *B60L 50/64* | (2019.01) |
| *H01M 4/131* | (2010.01) |
| *H01M 10/0565* | (2010.01) |
| *H01M 4/587* | (2010.01) |
| *H01M 10/0525* | (2010.01) |
| *H01M 10/0585* | (2010.01) |
| *H01M 50/112* | (2021.01) |
| *H01M 50/121* | (2021.01) |
| *H01M 50/102* | (2021.01) |

(52) U.S. Cl.
CPC ....... *H01M 50/102* (2021.01); *H01M 50/112* (2021.01); *H01M 50/121* (2021.01); *H01M 50/24* (2021.01); *H01M 2220/20* (2013.01)

(56) References Cited

U.S. PATENT DOCUMENTS

| | | | |
|---|---|---|---|
| 2017/0271711 A1* | 9/2017 | Benthien | H01M 4/661 |
| 2019/0305292 A1 | 10/2019 | Hudak et al. | |
| 2019/0334203 A1* | 10/2019 | Linde | H01M 4/747 |
| 2019/0351853 A1* | 11/2019 | Song | B60R 19/04 |

* cited by examiner

VEHICLE BODY MEMBER HAVING CHARGING AND DISCHARGING FUNCTION

CROSS-REFERENCE TO RELATED APPLICATIONS

The present application claims priority to Korean Patent Application No. 10-2020-0024671, filed Feb. 27, 2020, which application is incorporated herein by reference.

TECHNICAL FIELD

The present invention relates to a vehicle body member having a charging and discharging function.

BACKGROUND

Conventionally, it has been common to manufacture a vehicle body structure and various components using a steel material, but recently, a composite material such as a fiber-reinforced resin composite material has been used as a replacement for the steel material to improve fuel efficiency due to weight reduction.

In general, the fiber-reinforced resin composite material has a basic structure composed of a reinforcing material that plays a role as a load applied to a material and a base material that combines with the reinforcing material to realize the overall shape of the material and transmits the load applied to the material to the reinforcing material. Here, as the reinforcing material, a fiber-type reinforcing material such as carbon fiber, glass fiber, and aramid fiber is commonly used, and as the base material, a resin-based base material such as a thermosetting resin including phenol resin, epoxy resin, and the like or a thermoplastic resin including polyvinyl chloride (PVC), polyethylene (PE), polypropylene (PP) resin, and the like is commonly used.

Meanwhile, many of the components constituting a vehicle are electronic device means operated by power supplied from a battery. Recently, research on increasing the capacity of a battery in a vehicle has been continuously conducted due to an increase in the electronic device means.

The foregoing is intended merely to aid in the understanding of the background of the present invention, and is not intended to mean that the present invention falls within the purview of the related art that is already known to those skilled in the art.

SUMMARY

The present invention relates to a vehicle body member having a charging and discharging function. Particular embodiments relate to a vehicle body member having a charging and discharging function, wherein carbon fiber used for weight reduction and reinforcement purposes is used.

Embodiments of the present invention make use of the fact that carbon fiber used as the reinforcing material of the fiber-reinforced resin composite material can be used as a negative electrode constituting a secondary battery, and provide a back beam for a vehicle that can be charged and discharged by using the reinforcing material used for weight reduction and strength reinforcement of a vehicle.

Accordingly, embodiments of the present invention have been made keeping in mind problems occurring in the related art, and an embodiment of the present invention provides a vehicle body member having a charging and discharging function, wherein carbon fiber used as a reinforcement material in a roof panel and a roof rail of a vehicle body is used as a negative electrode of a secondary battery.

According to one embodiment of the present invention, there is provided a vehicle body member having a charging and discharging function, the vehicle body member being a roof member of a vehicle body, and including a first cell unit comprised of a first negative electrode part including carbon fiber, and a first positive electrode part disposed in contact with a first surface of the first negative electrode part and formed while including a positive electrode active material and a solid electrolyte, with at least one first via hole passing through the first negative electrode part and the first positive electrode part, a second cell unit comprised of a second negative electrode part including carbon fiber, and a second positive electrode part disposed in contact with a second surface of the second negative electrode part and formed while including a positive electrode active material and a solid electrolyte, with at least one second via hole passing through the second negative electrode part and the second positive electrode part, a reinforcing insulating layer formed in a honeycomb structure, having opposite surfaces each of which is provided with at least one insertion protrusion inserted into each of the first via hole and the second via hole, and interposed between a first surface of the first cell unit and a second surface of the second cell unit to electrically insulate the first and second cell units from each other, a first positive electrode current collector connected to the first positive electrode part of the first cell unit, a second positive electrode current collector connected to the second positive electrode part of the second cell unit while being connected in parallel to the first positive electrode current collector, a first negative electrode current collector connected to the first negative electrode part of the first cell unit, and a second negative electrode current collector connected to the second negative electrode part of the second cell unit while being connected in parallel to the first negative electrode current collector.

The first negative electrode current collector may be stacked on a second surface of the first cell unit, the second negative electrode current collector may be stacked on a first surface of the second cell unit, and a skin layer made of a composite material may be further stacked on each of a second surface of the first negative electrode current collector and a first surface of the second negative electrode current collector.

The skin layer may be made of a glass fiber-reinforced sheet.

The skin layer and the insertion protrusion of the reinforcing insulating layer may be directly adhered to each other.

Around an adhesion region where the skin layer and the insertion protrusion of the reinforcing insulating layer are directly adhered to each other, there may be formed an overlap region where the first cell unit, the second cell unit, the first negative electrode current collector, and the second negative electrode current collector may be deformed to be compressed by compression molding.

The reinforcing insulating layer may be made of a plastic polymer, and in the adhesion region, the skin layer and the reinforcing insulating layer may be adhered to each other by an adhesive, or a resin forming the skin layer and a resin forming the reinforcing insulating layer may be fused and adhered to each other.

Each of the first negative electrode part and the second negative electrode part may be formed by stacking a plurality of reinforcing fiber sheets in which carbon fibers may be provided in different arrangement directions.

The first positive electrode part may be comprised of a first positive electrode layer disposed opposite to the first surface of the first negative electrode part and in which the positive electrode active material is distributed, and a first solid electrolyte layer made of the solid electrolyte and disposed between the first negative electrode part and the first positive electrode layer so as to be in contact with each of the first negative electrode part and the first positive electrode layer, the second positive electrode part may be comprised of a second positive electrode layer disposed opposite to the second surface of the second negative electrode part and in which the positive electrode active material is distributed, and a second solid electrolyte layer made of the solid electrolyte and disposed between the second negative electrode part and the second positive electrode layer so as to be in contact with each of the second negative electrode part and the second positive electrode layer, and the first positive electrode layer and the second positive electrode layer may be electrically insulated from each other by the reinforcing insulating layer.

The roof member may be provided as a plurality of roof members, first positive electrode current collectors and second positive electrode current collectors constituting respective vehicle body members may be connected to each other in parallel, first negative electrode current collectors and second negative electrode current collectors constituting the respective vehicle body members may be connected to each other in parallel, and the first positive electrode current collectors, the second positive electrode current collectors, the first negative electrode current collectors, and the second negative electrode current collectors may be connected selectively to an alternator or an electronic device means of a vehicle by a switch, wherein while the first positive electrode current collectors, the second positive electrode current collectors, the first negative electrode current collectors, and the second negative electrode current collectors are electrically connected to the alternator of the vehicle, charging may be made through the vehicle body members, and while the first positive electrode current collectors, the second positive electrode current collectors, the first negative electrode current collectors, and the second negative electrode current collectors are connected to the electronic device means of the vehicle, power generated by discharging through the vehicle body members may be supplied to the electronic device means of the vehicle.

The plurality of roof members may be configured such that at least one thereof forms a roof panel of the vehicle, and a remaining roof member forms a roof rail of the vehicle.

According to an embodiment of the present invention, carbon fiber used for increasing the rigidity of the roof panel and the roof rail of the vehicle body is used as a negative electrode of a secondary battery, and each of the roof panel and the roof rail is equipped with a means to serve as a solid electrolyte and a positive electrode. This makes it possible to expect an effect of adding a secondary battery function capable of charging and discharging to the roof panel and the roof rail.

Furthermore, each of the roof panel and the roof rail is manufactured as a secondary battery capable of charging and discharging and the respective roof panel and roof rail are connected to each other in parallel. This makes it possible to expect an effect of increasing the capacity of the secondary battery.

Furthermore, the reinforced insulating layer of a honeycomb structure with the insertion protrusions is disposed between the first cell unit and the second cell unit where the via holes are formed, thereby making it possible to expect an effect of improving the interlayer shear strength due to the insertion protrusions inserted into the via holes, while increasing the rigidity due to the honeycomb structure.

BRIEF DESCRIPTION OF THE DRAWINGS

The above and other objectives, features, and other advantages of embodiments of the present invention will be more clearly understood from the following detailed description when taken in conjunction with the accompanying drawings, in which.

DETAILED DESCRIPTION OF ILLUSTRATIVE EMBODIMENTS

Figure 1:
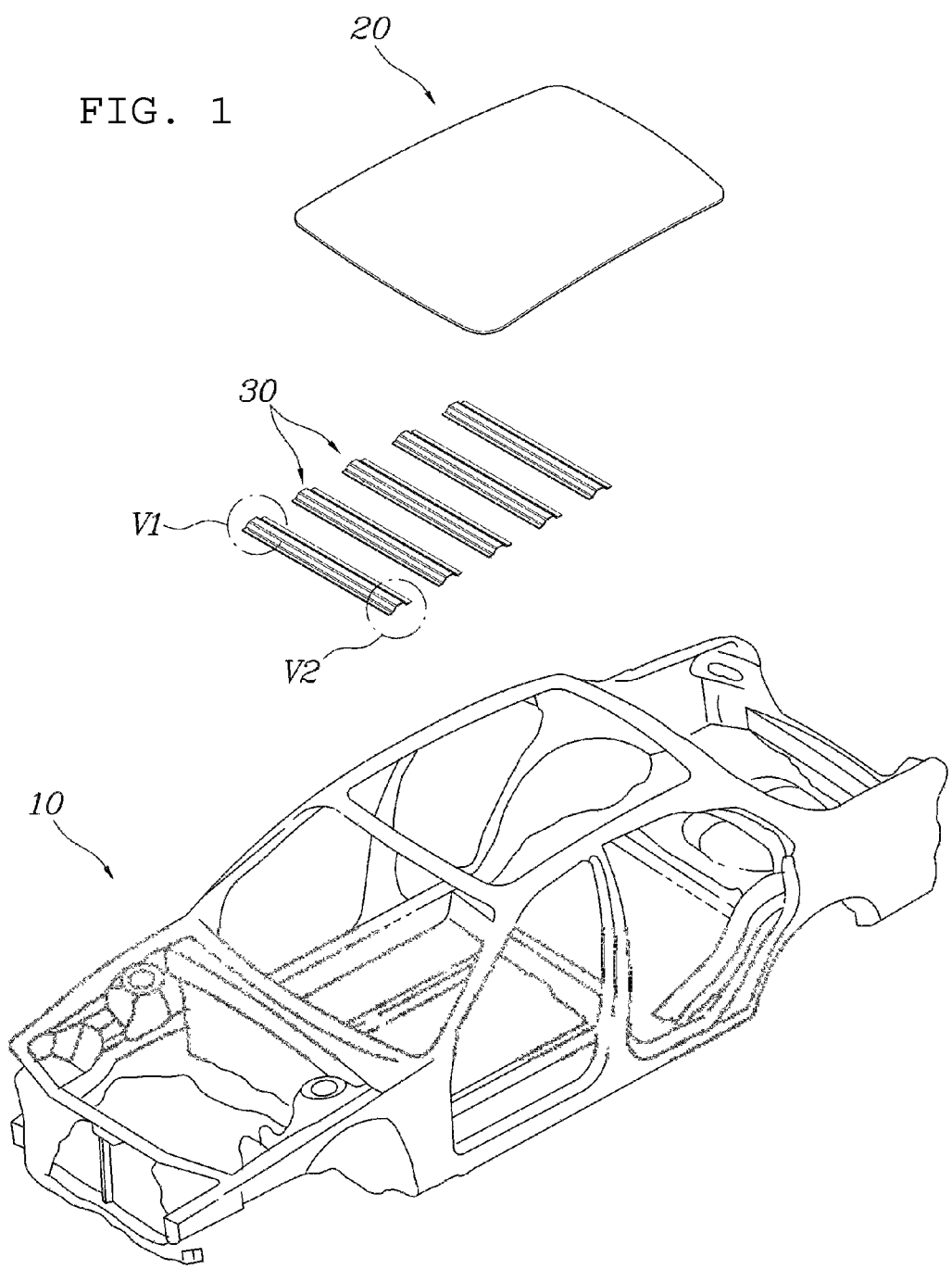
FIG. 1 is a view illustrating a vehicle in which a vehicle body member having a charging and discharging function according to an embodiment of the present invention is used.

Hereinafter, exemplary embodiments of the present invention will be described in more detail with reference to the accompanying drawings. However, the present invention is not limited to the embodiments disclosed below, but will be implemented in various different forms, and the embodiments of the present invention are presented to make complete disclosure of the present invention and help those who are ordinarily skilled in the art best understand the invention. The same reference numerals are used throughout the different drawings to designate the same or similar components.

Figure 2A:
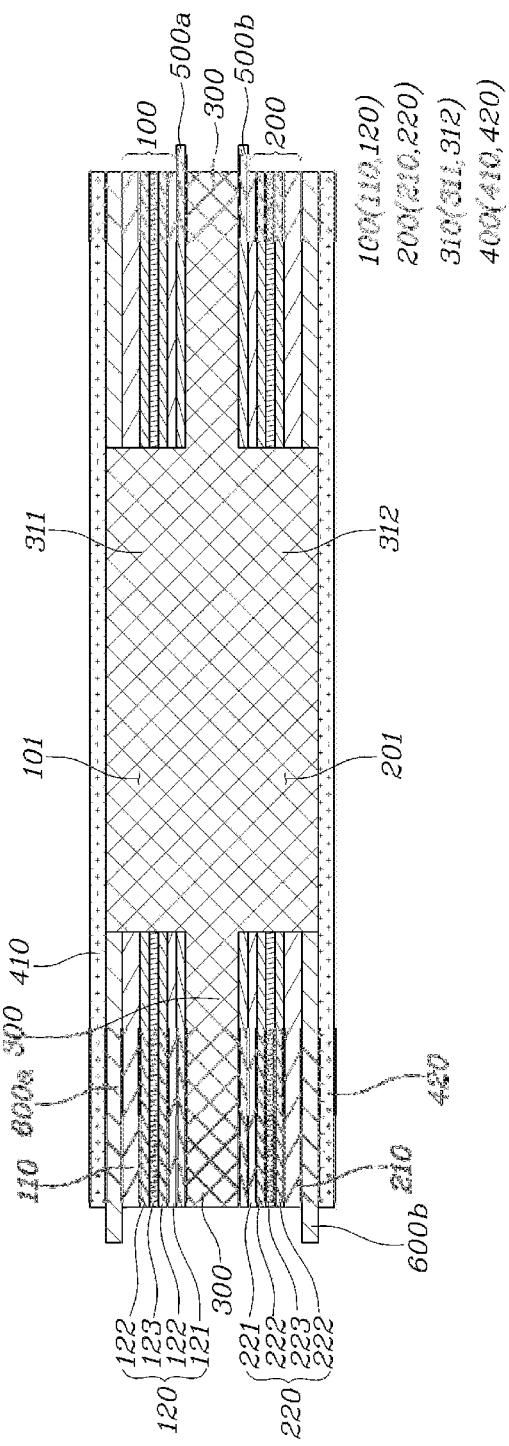
FIGS. 2A and 2B are sectional views illustrating a vehicle body member having a charging and discharging function according to an embodiment of the present invention.
Figure 2B:
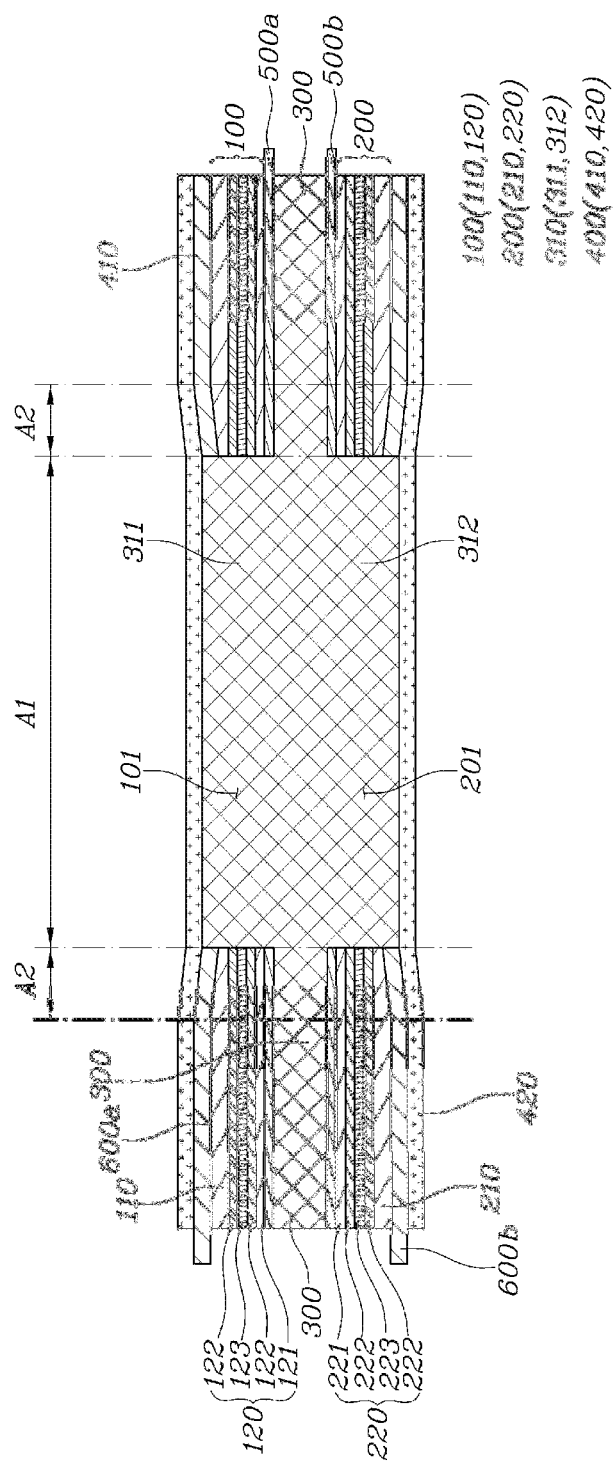
Figure 3A:
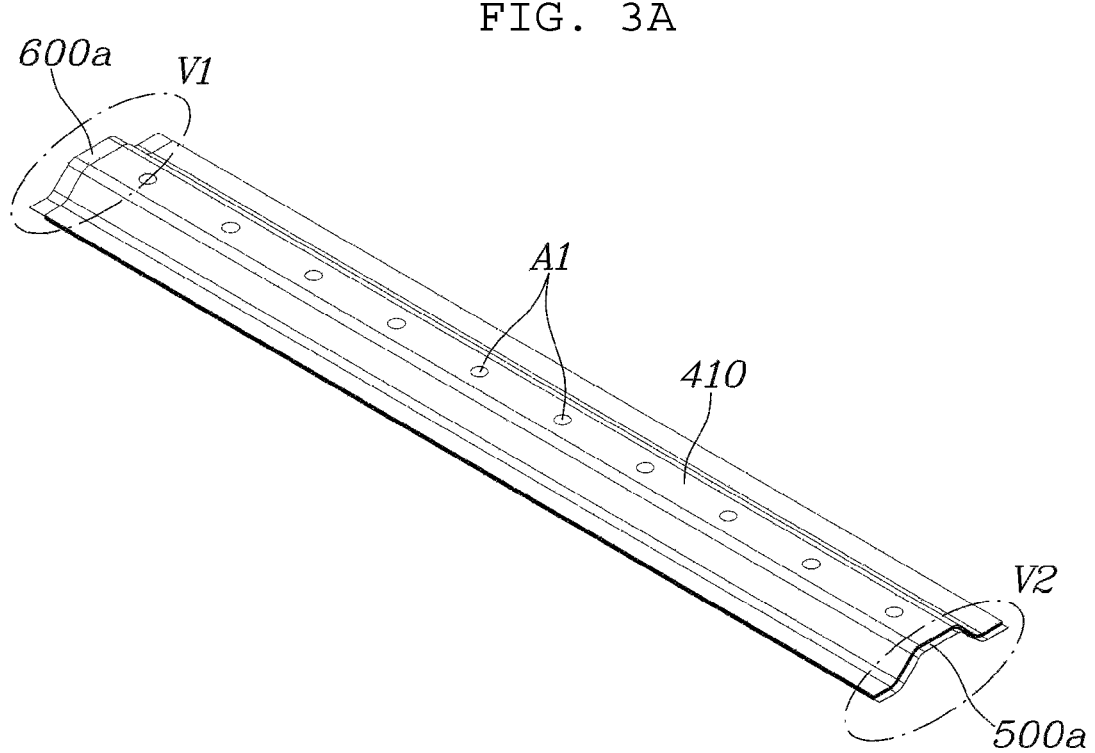
FIGS. 3A to 3C are respectively a perspective view and main-part enlarged perspective views illustrating a vehicle body member having a charging and discharging function according to an embodiment of the present invention.
Figure 3B:
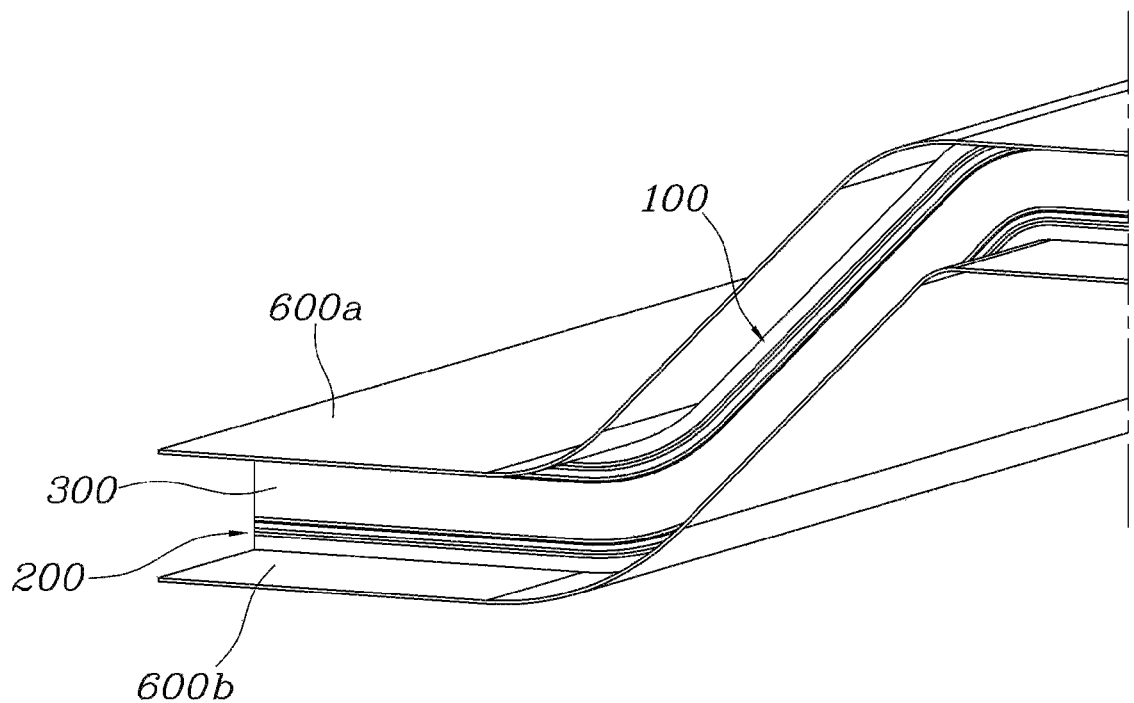
Figure 3C:
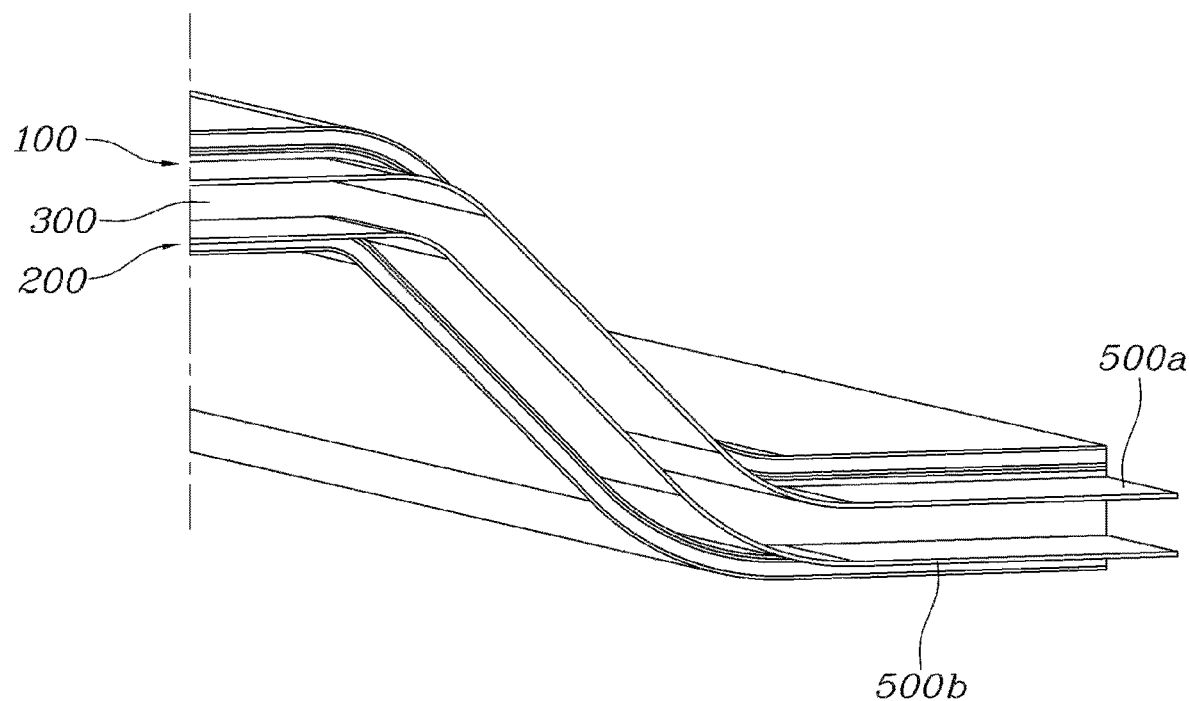
Figure 4A:
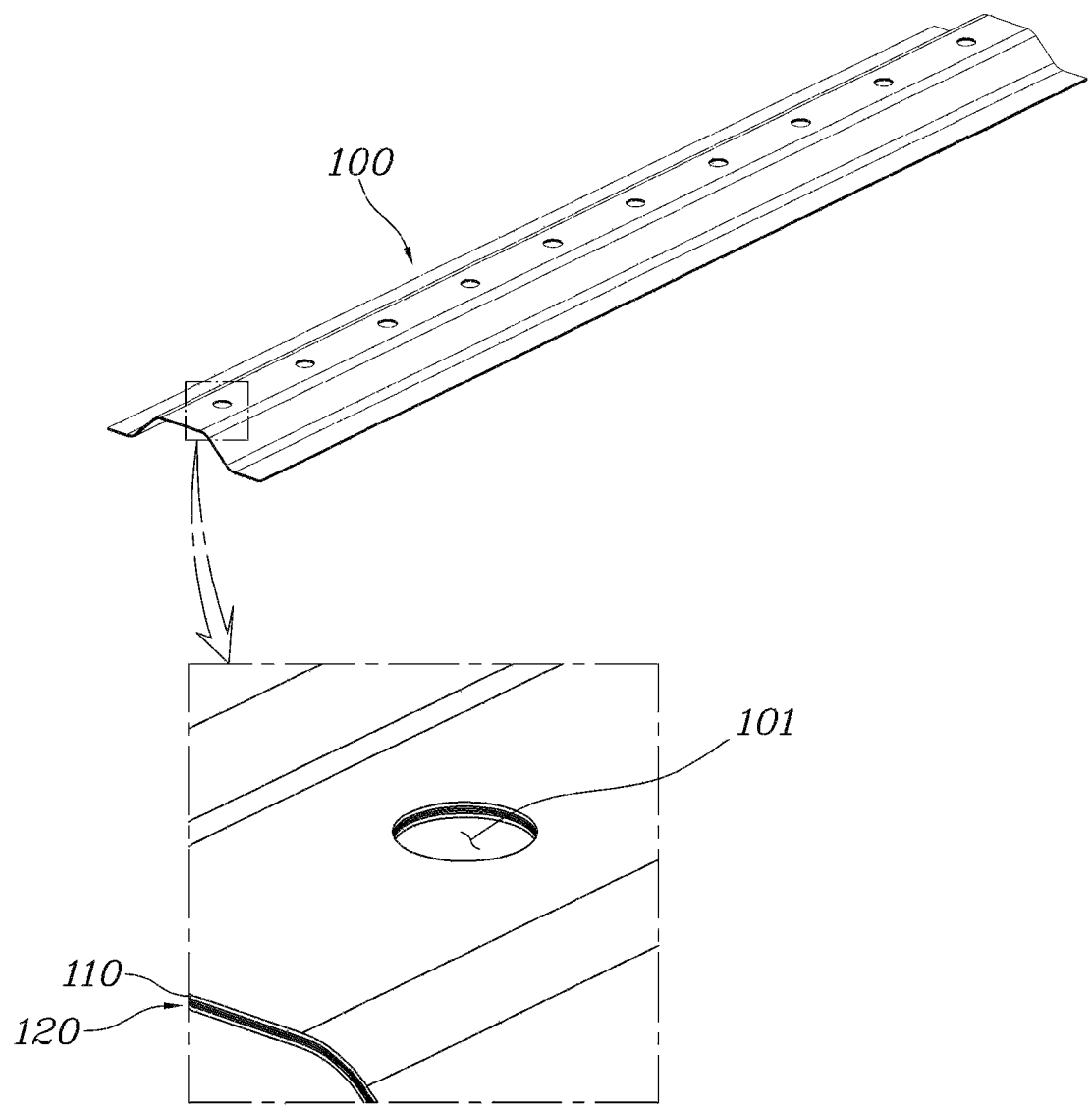
FIGS. 4A to 4C are respectively a perspective view and main-part enlarged perspective views illustrating main components constituting a vehicle body member having a charging and discharging function according to an embodiment of the present invention.
Figure 4B:
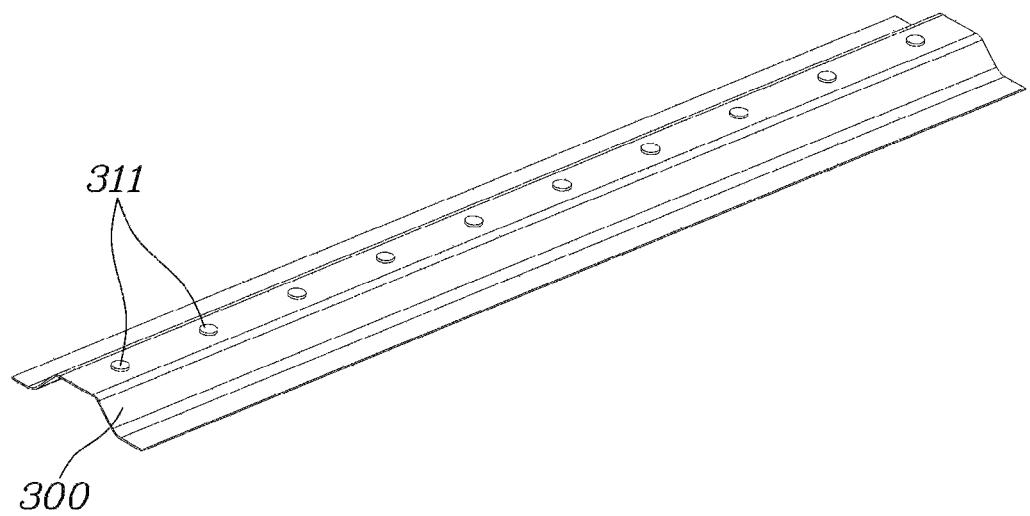
Figure 4C:
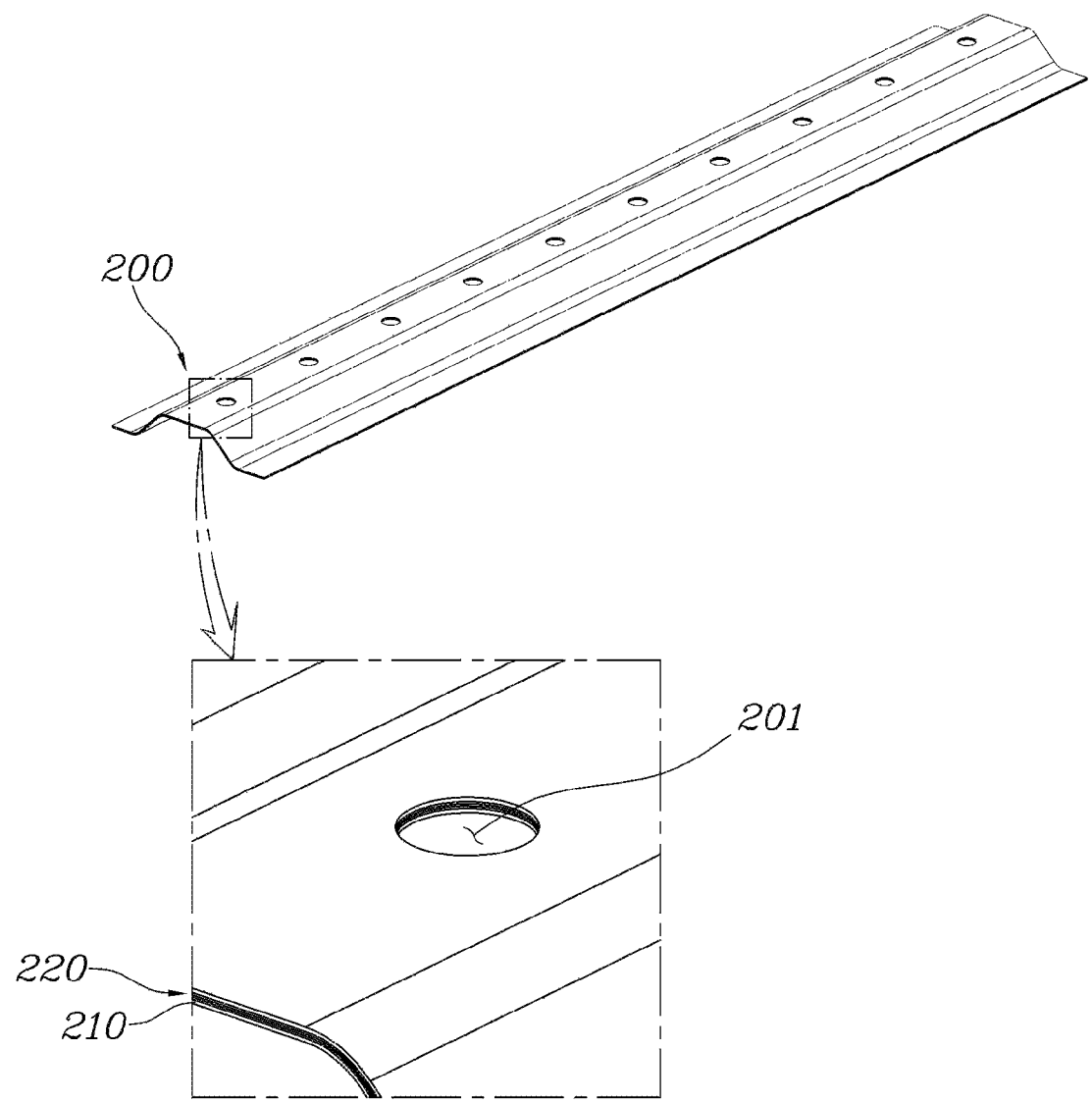
Figure 5:
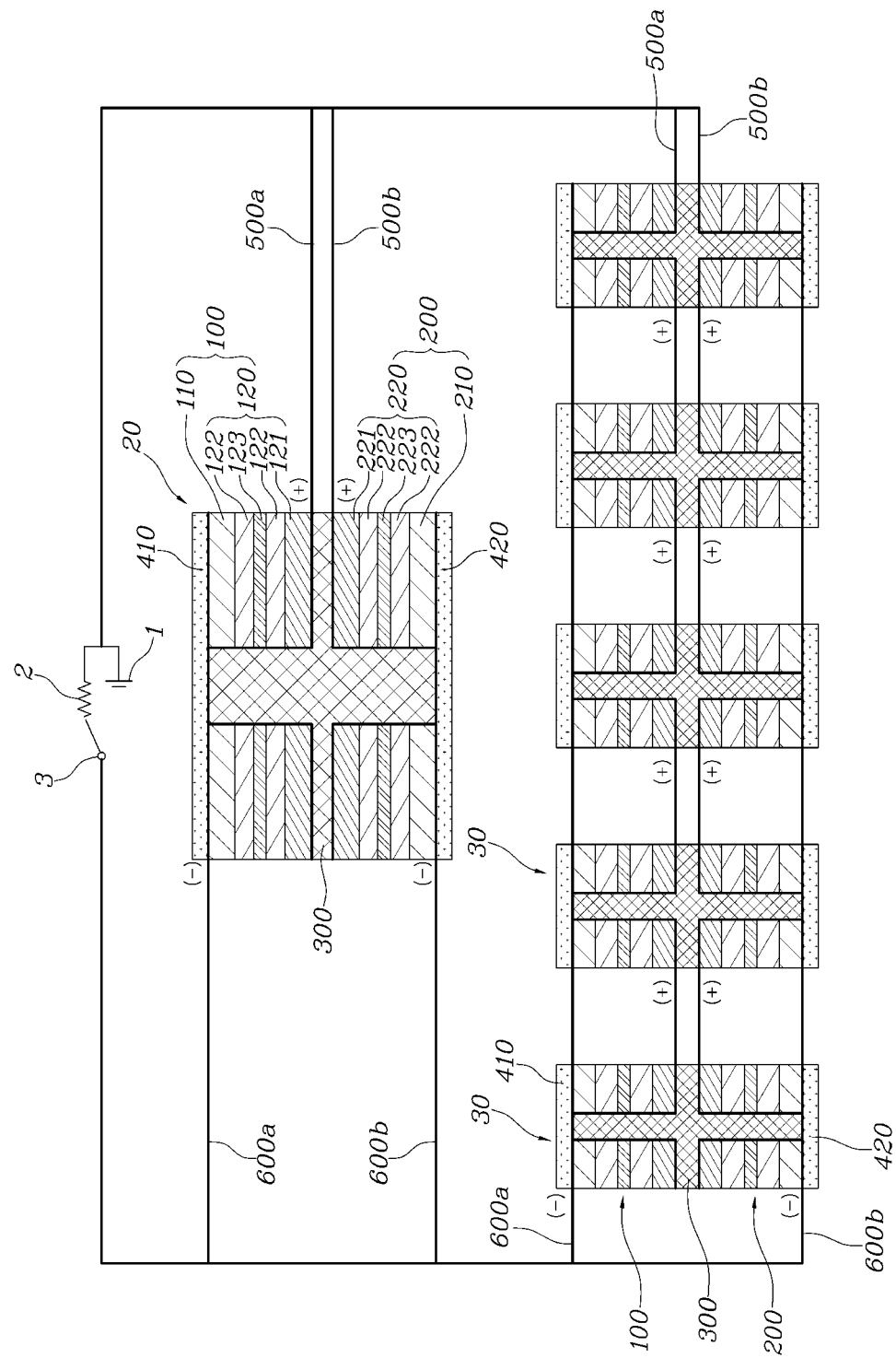
FIG. 5 is a circuit diagram illustrating a vehicle body member having a charging and discharging function according to an embodiment of the present invention.

FIG. 1 is a view illustrating a vehicle in which a vehicle body member having a charging and discharging function according to an embodiment of the present invention is used, FIGS. 2A and 2B are sectional views illustrating a vehicle body member having a charging and discharging function according to an embodiment of the present invention, FIGS. 3A to 3C are respectively a perspective view and main-part enlarged perspective views illustrating a vehicle body member having a charging and discharging function according to an embodiment of the present invention, FIGS. 4A to 4C are respectively a perspective view and main-part enlarged perspective views illustrating main components of the vehicle body member having a charging and discharging function according to an embodiment of the present invention, and FIG. 5 is a circuit diagram illustrating a vehicle body member having a charging and discharging function according to an embodiment of the present invention.

Here, FIG. 2A is a sectional view illustrating a state before each component is pressure-molded after being stacked, and FIG. 2B is a sectional view illustrating a state after each component is pressure-molded after being stacked. Furthermore, FIG. 3B is an enlarged view illustrating a portion "V1" illustrated in FIG. 3A, and FIG. 3C is an enlarged view illustrating a portion "V2" illustrated in FIG. 3A. FIG. 4A is a view illustrating a first cell unit, FIG. 4B is a view illustrating a reinforcing insulating layer, and FIG. 4C is a view illustrating a second cell unit.

First, the vehicle body member having the charging and discharging function according to an embodiment of the present invention can find application in various components of a vehicle. Hereinafter, as an example of the vehicle body member, a roof member of the vehicle body, i.e., a roof panel and a roof rail, will be described.

As illustrated in the drawings, the vehicle body member having the charging and discharging function according to embodiments of the present invention is provided as a plurality of vehicle body members configured such that at least one vehicle body member forms a roof panel 20 of a vehicle body 10, and a remaining vehicle body member forms a roof rail 30 of the vehicle body 10. Here, each of the vehicle body members 20 and 30 that form the roof panel 20 and the roof rail 30 serves as a secondary battery having a charging and discharging function.

To this end, each of the vehicle body members 20 and 30 includes a first cell unit 100, a second cell unit 200, a reinforcing insulating layer 300, a skin layer 400, a positive electrode current collector 500, and a negative electrode current collector 600.

The first cell unit 100 is a means for forming one unit cell, and is comprised of a first negative electrode part 110 including carbon fiber, and a first positive electrode part 120 disposed in contact with a first surface of the first negative electrode part 110 and formed while including a positive electrode active material and a solid electrolyte.

Here, the first negative electrode part 110 is a reinforcement means for increasing rigidity while realizing the shape of the roof panel 20 and the roof rail 30. In the present embodiment, the first negative electrode part 110 also serves as a negative electrode for performing the charging and discharging function. To this end, the first negative electrode part 110 is made of a composite material including carbon fiber made of a carbon material that facilitates oxidation and reduction of lithium ions.

Here, in order to increase rigidity, the first cell unit 100 may be provided by stacking a plurality of reinforcing fiber sheets provided in different arrangement directions.

The first positive electrode part 120 is a means for performing a role of a solid-state separator as well as a role of a positive electrode for performing the charging and discharging function, and may be implemented by including a positive electrode active material used as a positive electrode in a typical secondary battery. For example, the first positive electrode part 120 may include lithium metal oxide. Furthermore, the first positive electrode part 120 may be implemented by the use of a material used as a solid-state electrolyte, i.e., a solid electrolyte in a typical secondary battery.

For example, the first positive electrode part 120 may be comprised of a first positive electrode layer 121 disposed opposite to the first surface of the first negative electrode part 11o and in which the positive electrode active material is distributed, and a first solid electrolyte layer 122 made of a solid electrolyte and disposed between the first negative electrode part 11o and the first positive electrode layer 121 so as to be in contact with each of the first negative electrode part 110 and the first positive electrode layer 121. Here, a first separator 123 separating the first negative electrode part 110 and the first positive electrode layer 121 from each other may be further interposed between the respective first solid electrolyte layers 122.

Meanwhile, at least one first via hole 101 passing through the first negative electrode part 110 and the first positive electrode part 120 is formed in the first cell unit 100. In detail, the first cell unit 100 is configured such that the first via hole 101 is formed to sequentially pass through the first negative electrode part 110, the first solid electrolyte layers 122 having the first separator 123 interposed therebetween, and the first positive electrode layer 121.

Furthermore, the second cell unit 200 is also a means for forming one unit cell, and is comprised of a second negative electrode part 210 including carbon fiber, and a second positive electrode part 220 disposed in contact with a second surface of the second negative electrode part 210 and formed while including a positive electrode active material and a solid electrolyte.

Here, the second negative electrode part 210 is a reinforcement means for increasing rigidity while realizing the shape of the roof panel 20 and the roof rail 30. In the present embodiment, the second negative electrode part 210 also serves as a negative electrode for performing the charging and discharging function. To this end, the second negative electrode part 210 is made of a composite material including carbon fiber made of a carbon material that facilitates oxidation and reduction of lithium ions.

Here, in order to increase rigidity, the second cell unit 200 may also be provided by stacking a plurality of reinforcing fiber sheets provided in different arrangement directions for increasing rigidity.

The second positive electrode part 220 is a means for performing a role of a solid-state separator as well as a role of a positive electrode for performing the charging and discharging function, and may be implemented by including a positive electrode active material used as a positive electrode in a typical secondary battery. For example, the second positive electrode part 220 may include lithium metal oxide. Furthermore, the second positive electrode part 220 may be implemented by the use of a material used as a solid-state electrolyte, i.e., a solid electrolyte in a typical secondary battery.

For example, the second positive electrode part 220 may be comprised of a second positive electrode layer 221 disposed opposite to the second surface of the second negative electrode part 210 and in which the positive electrode active material is distributed, and a second solid electrolyte layer 222 made of a solid electrolyte and disposed between the second negative electrode part 210 and the second positive electrode layer 221 so as to be in contact with each of the second negative electrode part 210 and the second positive electrode layer 221. Here, a second separator 223 separating the second negative electrode part 210 and the second positive electrode layer 221 from each other may be further interposed between the respective second solid electrolyte layers 222.

Furthermore, at least one second via hole 201 passing through the second negative electrode part 210 and the second positive electrode part 220 in a predetermined region may be formed in the second cell unit 200. In detail, the second cell unit 200 is configured such that the second via hole 201 is formed to sequentially pass through the second negative electrode part 210, the second solid electrolyte layers 222 having the second separator 223 interposed therebetween, and the second positive electrode layer 221.

Here, it is preferable that the second via hole 201 is formed at a position corresponding to a position where the first via hole 101 is formed so that the first via hole 101 and the second via hole 201 are in communication with each other.

Furthermore, the reinforcing insulating layer 300 is disposed between the first positive electrode layer 121 and the second positive electrode layer 221 to electrically insulate the first and second positive electrode layers 121 and 221 from each other. Thus, the first cell unit 100 and the second cell unit 200 are disposed to be symmetrical to each other with respect to the reinforcing insulating layer 300.

The reinforcing insulating layer 300 serves to electrically insulate the first cell unit 100 and the second cell unit 200 from each other, while maintaining the first cell unit 100 and the second cell unit 200 structurally and firmly. To this end, the reinforcing insulating layer 300 is formed in a panel form having a honeycomb structure.

Furthermore, the reinforcing insulating layer 300 has opposite surfaces each of which is provided with at least one insertion protrusion 310 inserted into each of the first via hole 101 and the second via hole 201. For example, a first insertion protrusion 311 inserted into the first via hole 101 may be formed on a second surface of the reinforcing insulating layer 300 facing the first cell unit 100, and a second insertion protrusion 312 inserted into the second via hole 201 may be formed on a first surface of the reinforcing insulating layer 300 facing the second cell unit 200.

Meanwhile, in the present embodiment, the first cell unit 100 and the second cell unit 200 each of which constitutes one unit cell are electrically connected to each other in parallel to increase the charge/discharge capacity.

To this end, a first positive electrode current collector 500a connected to the first positive electrode part 120 of the first cell unit 100 is provided, and a second positive electrode current collector 500b connected to the second positive electrode part 220 of the second cell unit 200 is provided, so that the first positive electrode current collector 500a and the second positive electrode current collector 500b are connected to each other in parallel.

Furthermore, a first negative electrode current collector 600a connected to the first negative electrode part 11o of the first cell unit 100 is provided, and a second negative electrode current collector 600b connected to the second negative electrode part 210 of the second cell unit 200 is provided, so that the first negative electrode current collector 600a and the second negative electrode current collector 600b are connected to each other in parallel.

Here, it is preferable that the first positive electrode current collector 500a and the first negative electrode current collector 600a are configured such that the first via hole 101 formed in the first cell unit 100 passes therethrough, and the second positive electrode current collector 500b and the second negative electrode current collector 600b are configured such that the second via hole 201 formed in the second cell unit 200 passes therethrough.

Meanwhile, the skin layer 400 is stacked on each of the outermost layers of each of the vehicle body members 20 and 30 to electrically insulate the vehicle body members 20 and 30 from other vehicle body members 20 and 30, while stably maintaining the stacked structure of the components constituting the vehicle body members 20 and 30.

For example, a first skin layer 410 is stacked on a second surface of the first negative electrode current collector 600a, and a second skin layer 420 is stacked on a first surface of the second negative electrode current collector 600b.

Here, it is preferable that the first skin layer 410 and the second skin layer 420 are made of a glass fiber-reinforced sheet made of glass fiber and resin which are electrically non-conductive.

Meanwhile, it is preferable that the skin layer 400 and the insertion protrusion 310 of the reinforcing insulating layer 300 are directly adhered to each other. For example, the first insertion protrusion 310 of the reinforcing insulating layer 300 may pass through the first via hole 101, with an end thereof directly adhered to the first skin layer 410, and the second insertion protrusion 320 of the reinforcing insulating layer 300 may pass through the second via hole 201, with an end thereof directly adhered to the second skin layer 420. Here, a region where the skin layer 400 and the insertion protrusion 310 of the reinforcing insulating layer 300 are directly adhered to each other is referred to as an adhesion region A1.

Thus, in the adhesion region A1, the skin layer 400 and the reinforcing insulating layer 300 may be adhered to each other by an adhesive.

Furthermore, in order to improve stacking strength of each of the vehicle body members 20 and 30, the first cell unit 100, the second cell unit 200, the reinforcing insulating layer 300, the skin layer 400, the positive electrode current collector 500, and the negative electrode current collector 600 may be formed by hot pressing (see FIG. 2B).

Here, in the adhesion region A1, a resin forming the skin layer 400 and a resin forming the reinforcing insulating layer 300 may be fused and adhered to each other.

Furthermore, around the adhesion region A1, there is formed an overlap region A2 where the first cell unit 100, the second cell unit 200, the first negative electrode current collector 600a, and the second negative electrode current collector 600b are deformed to be compressed by compression molding. In the overlap region A2, the first negative electrode current collector 600a and the second negative electrode current collector 600b are deformed in a shape inclined in the direction of the adhesion region A1, and due to this deformation, stacking strength of the vehicle body members 20 and 30 is improved, and the shear strength is also improved.

Meanwhile, the vehicle body member 20 and 30 of the vehicle body 10 is usually comprised of one roof panel 20 and a plurality of roof rails 30.

Thus, as illustrated in FIG. 5, when the vehicle body members 20 and 30 are comprised of one roof panel 20 and the plurality of roof rails 30, a first positive electrode current collector 500a and a second positive electrode current collector 500b constituting the roof panel 20 are connected to each other in parallel, while a first negative electrode current collector 600a and a second negative electrode current collector 600b are connected to each other in parallel. Furthermore, first positive electrode current collectors 500a constituting the respective roof rails 30 are connected to each other in parallel, first negative electrode current collectors 600a are connected to each other in parallel, second positive electrode current collectors 500b are connected to each other in parallel, and second negative electrode current collectors 600b are connected to each other in parallel.

The first positive electrode current collectors 500a, the second positive electrode current collectors 500b, the first negative electrode current collectors 600a, and the second negative electrode current collectors 600b configured as described above are connected selectively to an alternator 1 or an electronic device 2 of the vehicle by a switch 3.

Thus, while the first positive electrode current collectors 500a, the second positive electrode current collectors 500b, the first negative electrode current collectors 600a, and the second negative electrode current collectors 600b are electrically connected to the alternator 1 of the vehicle, charging is made through the roof panel 20 and the roof rails 30.

Furthermore, while the first positive electrode current collectors 500*a*, the second positive electrode current collectors 500*b*, the first negative electrode current collectors 600*a*, and the second negative electrode current collectors 600*b* are connected to the electronic device 2 of the vehicle, power generated by discharging through the roof panel 20 and the roof rails 30 is supplied to the electronic device 2 of the vehicle.

Here, the electronic device 2 denotes a component provided in the vehicle and operated by supply of power. For example, various lamps such as room lamps provided in the interior of the vehicle may be used.

Furthermore, the vehicle body members comprised of the roof panel 20 and the plurality of roof rails 30 are configured such that, due to the structure of the vehicle body 10, the plurality of roof rails 30 are arranged spaced apart from each other at an equal interval and the roof panel 20 is disposed on top thereof. Here, the plurality of roof rails 30 and the roof panel 20 are electrically insulated from each other by skin layers 400.

Although the present invention has been described with reference to the accompanying drawings and the exemplary embodiments described above, the scope of the present invention should not be limited to the described embodiments, but should be determined by the accompanying claims and equivalents thereof. Therefore, those skilled in the art will appreciate that various modifications, additions and substitutions are possible, without departing from the scope and spirit of the invention as disclosed in the accompanying claims.

What is claimed is:

1. A vehicle body member having a charging and discharging function, the vehicle body member comprising:
    a first cell unit comprised of a first negative electrode part and a first positive electrode part disposed in contact with a first surface of the first negative electrode part, the first negative electrode part including carbon fiber and the first positive electrode part including a first positive electrode active material and a first solid electrolyte, wherein at least one first via hole passes through the first negative electrode part and the first positive electrode part;
    a second cell unit comprised of a second negative electrode part and a second positive electrode part disposed in contact with a first surface of the second negative electrode part, the second negative electrode part including carbon fiber and the second positive electrode part including a second positive electrode active material and a second solid electrolyte, wherein at least one second via hole passes through the second negative electrode part and the second positive electrode part;
    a reinforcing insulating layer formed in a honeycomb structure and having opposite surfaces, each of the opposite surfaces provided with at least one insertion protrusion inserted into each of the first via hole and the second via hole respectively, the reinforcing insulating layer interposed between a first surface of the first cell unit and a second surface of the second cell unit to electrically insulate the first and second cell units from each other;
    a first positive electrode current collector connected to the first positive electrode part of the first cell unit;
    a second positive electrode current collector connected to the second positive electrode part of the second cell unit and connected in parallel to the first positive electrode current collector;
    a first negative electrode current collector connected to the first negative electrode part of the first cell unit; and
    a second negative electrode current collector connected to the second negative electrode part of the second cell unit and connected in parallel to the first negative electrode current collector.

2. The vehicle body member of claim 1, wherein:
    the first negative electrode current collector is stacked on a second surface of the first cell unit;
    the second negative electrode current collector is stacked on a first surface of the second cell unit; and
    a skin layer made of a composite material is stacked on each of a second surface of the first negative electrode current collector and a first surface of the second negative electrode current collector.

3. The vehicle body member of claim 2, wherein the skin layer comprises a glass fiber-reinforced sheet.

4. The vehicle body member of claim 2, wherein the skin layer and the insertion protrusion of the reinforcing insulating layer are directly adhered to each other.

5. The vehicle body member of claim 4, further comprising:
    an adhesion region where the skin layer and the insertion protrusion of the reinforcing insulating layer are directly adhered to each other; and
    an overlap region around the adhesion region, wherein the first cell unit, the second cell unit, the first negative electrode current collector, and the second negative electrode current collector are deformed to be compressed by compression molding in the overlap region.

6. The vehicle body member of claim 5, wherein:
    the reinforcing insulating layer comprises a plastic polymer; and
    in the adhesion region, the skin layer and the reinforcing insulating layer are adhered to each other by an adhesive.

7. The vehicle body member of claim 5, wherein:
    the reinforcing insulating layer comprises a plastic polymer; and
    a resin forming the skin layer and a resin forming the reinforcing insulating layer are fused and adhered to each other in the adhesion region.

8. The vehicle body member of claim 1, wherein each of the first negative electrode part and the second negative electrode part is formed by stacking a plurality of reinforcing fiber sheets in which carbon fibers are provided in different arrangement directions.

9. The vehicle body member of claim 1, wherein:
    the first positive electrode part comprises a first positive electrode layer disposed opposite to the first surface of the first negative electrode part and in which the first positive electrode active material is distributed, and a first solid electrolyte layer made of the first solid electrolyte and disposed between the first negative electrode part and the first positive electrode layer so as to be in contact with each of the first negative electrode part and the first positive electrode layer;
    the second positive electrode part comprises a second positive electrode layer disposed opposite to the second surface of the second negative electrode part and in which the second positive electrode active material is distributed, and a second solid electrolyte layer made of the second solid electrolyte and disposed between the second negative electrode part and the second positive electrode layer so as to be in contact with each of the second negative electrode part and the second positive electrode layer; and the first positive electrode layer and the second positive electrode layer are electrically insulated from each other by the reinforcing insulating layer.

10. The vehicle body member of claim 1, wherein:
the vehicle body member comprises a plurality of roof members;
first positive electrode current collectors and second positive electrode current collectors constituting respective roof members are connected to each other in parallel;
first negative electrode current collectors and second negative electrode current collectors constituting the respective roof members are connected to each other in parallel; and
the first positive electrode current collectors, the second positive electrode current collectors, the first negative electrode current collectors, and the second negative electrode current collectors are connected selectively to an alternator or an electronic device of a vehicle by a switch.

11. The vehicle body member of claim 10, wherein:
while the first positive electrode current collectors, the second positive electrode current collectors, the first negative electrode current collectors, and the second negative electrode current collectors are electrically connected to the alternator of the vehicle, charging is to be made through the plurality of roof members; and
while the first positive electrode current collectors, the second positive electrode current collectors, the first negative electrode current collectors, and the second negative electrode current collectors are connected to the electronic device of the vehicle, power generated by discharging through the plurality of roof members is to be supplied to the electronic device of the vehicle.

12. The vehicle body member of claim 10, wherein the plurality of roof members is configured such that at least one of the roof members forms a roof panel of the vehicle, and at least a remaining one of the roof members forms a roof rail of the vehicle.

13. A vehicle comprising:
a vehicle body; and
an electric device within the vehicle body;
wherein the vehicle body includes a vehicle roof member electrically connected to the electric device, the vehicle roof member comprising:
a first cell unit comprised of a first negative electrode part and a first positive electrode part disposed in contact with a first surface of the first negative electrode part, the first negative electrode part including carbon fiber and the first positive electrode part including a first positive electrode active material and a first solid electrolyte, wherein at least one first via hole passes through the first negative electrode part and the first positive electrode part;
a second cell unit comprised of a second negative electrode part and a second positive electrode part disposed in contact with a first surface of the second negative electrode part, the second negative electrode part including carbon fiber and the second positive electrode part including a second positive electrode active material and a second solid electrolyte, wherein at least one second via hole passes through the second negative electrode part and the second positive electrode part;
a reinforcing insulating layer formed in a honeycomb structure, having opposite surfaces each of which is provided with at least one insertion protrusion inserted into each of the first via hole and the second via hole, and interposed between a first surface of the first cell unit and a second surface of the second cell unit to electrically insulate the first and second cell units from each other;
a first positive electrode current collector connected to the first positive electrode part of the first cell unit;
a second positive electrode current collector connected to the second positive electrode part of the second cell unit and connected in parallel to the first positive electrode current collector;
a first negative electrode current collector connected to the first negative electrode part of the first cell unit; and
a second negative electrode current collector connected to the second negative electrode part of the second cell unit and connected in parallel to the first negative electrode current collector.

14. The vehicle of claim 13, wherein:
the first negative electrode current collector is stacked on a second surface of the first cell unit;
the second negative electrode current collector is stacked on a first surface of the second cell unit; and
a skin layer made of a composite material is stacked on each of a second surface of the first negative electrode current collector and a first surface of the second negative electrode current collector.

15. The vehicle of claim 14, wherein the skin layer comprises a glass fiber-reinforced sheet.

16. The vehicle of claim 14, wherein the skin layer and the insertion protrusion of the reinforcing insulating layer are directly adhered to each other.

17. The vehicle of claim 16, further comprising:
an adhesion region where the skin layer and the insertion protrusion of the reinforcing insulating layer are directly adhered to each other; and
an overlap region around the adhesion region, wherein the first cell unit, the second cell unit, the first negative electrode current collector, and the second negative electrode current collector are deformed to be compressed by compression molding in the overlap region.

18. The vehicle of claim 17, wherein:
the reinforcing insulating layer comprises a plastic polymer; and
the skin layer and the reinforcing insulating layer are adhered to each other by an adhesive or a resin forming the skin layer and a resin forming the reinforcing insulating layer are fused and adhered to each other in the adhesion region.

19. The vehicle of claim 13, wherein each of the first negative electrode part and the second negative electrode part is formed by stacking a plurality of reinforcing fiber sheets in which carbon fibers are provided in different arrangement directions.

20. The vehicle of claim 13, wherein:
the first positive electrode part comprises a first positive electrode layer disposed opposite to the first surface of the first negative electrode part and in which the first positive electrode active material is distributed, and a first solid electrolyte layer made of the first solid electrolyte and disposed between the first negative electrode part and the first positive electrode layer so as to be in contact with each of the first negative electrode part and the first positive electrode layer;
the second positive electrode part comprises a second positive electrode layer disposed opposite to the second surface of the second negative electrode part and in which the second positive electrode active material is distributed, and a second solid electrolyte layer made of the second solid electrolyte and disposed between the second negative electrode part and the second positive electrode layer so as to be in contact with each of the second negative electrode part and the second positive electrode layer; and the first positive electrode layer and the second positive electrode layer are electrically insulated from each other by the reinforcing insulating layer.

* * * * *